United States Patent [19]

Orlando

[11] Patent Number: 4,893,459
[45] Date of Patent: Jan. 16, 1990

[54] VARIABLE FORCE SHAKER

[75] Inventor: Franklin P. Orlando, Morgan Hill, Calif.

[73] Assignee: FMC Corporation, Chicago, Ill.

[21] Appl. No.: 217,260

[22] Filed: Jul. 11, 1988

[51] Int. Cl.$^4$ ............................................. A01D 46/00
[52] U.S. Cl. .................................... 56/340.1; 56/328.1
[58] Field of Search ...................... 56/328.1, 329, 340.1

[56] References Cited

U.S. PATENT DOCUMENTS

| | | | |
|---|---|---|---|
| 3,762,139 | 10/1973 | Tompkins | 56/340.1 |
| 3,771,301 | 11/1973 | Favor | 56/340.1 |
| 3,771,768 | 11/1973 | Gebendinger | 56/340.1 X |
| 3,964,244 | 6/1976 | Vallecella | 56/329 |
| 4,194,347 | 3/1980 | Peters | 56/328 |
| 4,435,950 | 3/1984 | Deux et al. | 56/328.1 X |
| 4,776,156 | 10/1988 | Brown et al. | 56/340.1 |

OTHER PUBLICATIONS

American Society of Agricultural Engineers Article, Paper No. 87-1576, by H. A. Affeldt Jr., G. K. Brown, J. B. Gerrish and T. A. Esch, Dec. 1987.

*Primary Examiner*—Thuy M. Bui
*Attorney, Agent, or Firm*—A. J. Moore; R. C. Kamp; R. B. Megley

[57] ABSTRACT

A variable force tree shaker is disclosed including a rotatable housing supporting a weight fixed to the housing and a movable weight, with the movable weight being capable of being moved between a balanced position and a plurality of unbalanced positions while the housing is rotating at a shaking speed. Hydraulic fluid is controllably directed into the housing between the fixed and movable weights to move the movable weight while the housing is rotating.

15 Claims, 3 Drawing Sheets

FIG_1
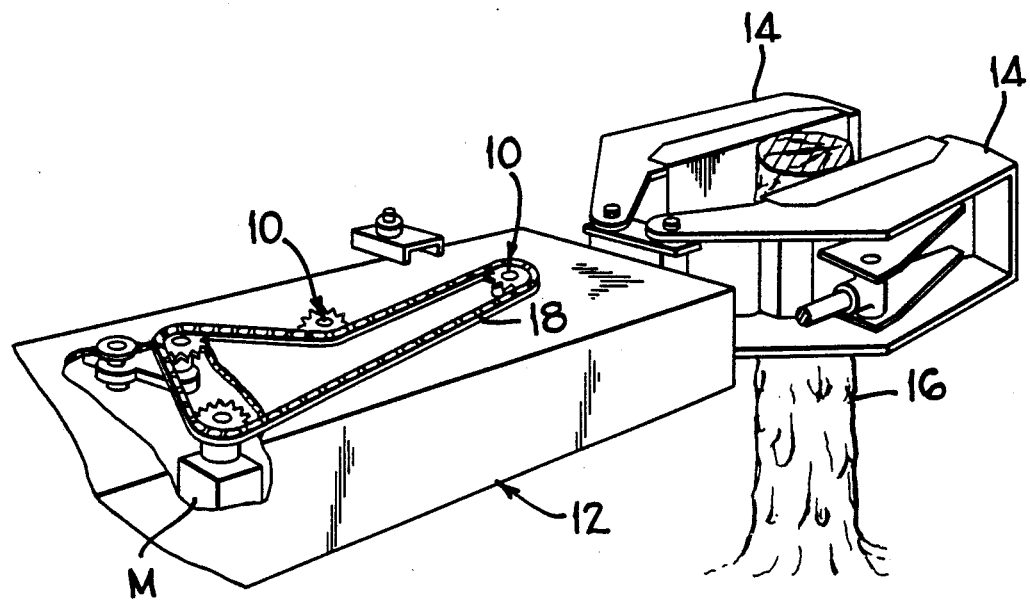
FIG_2
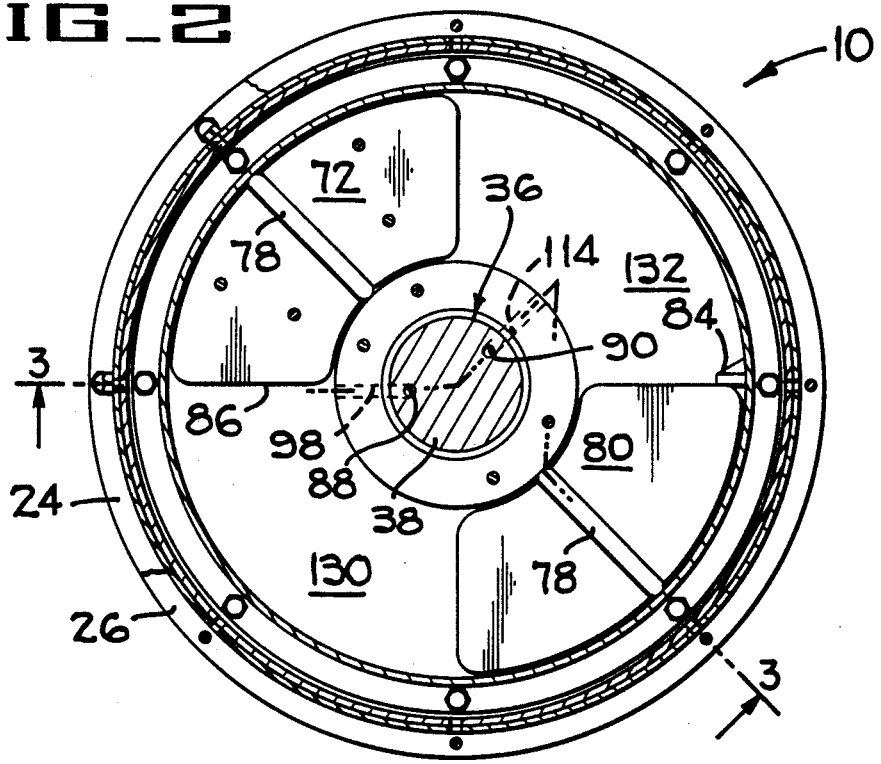

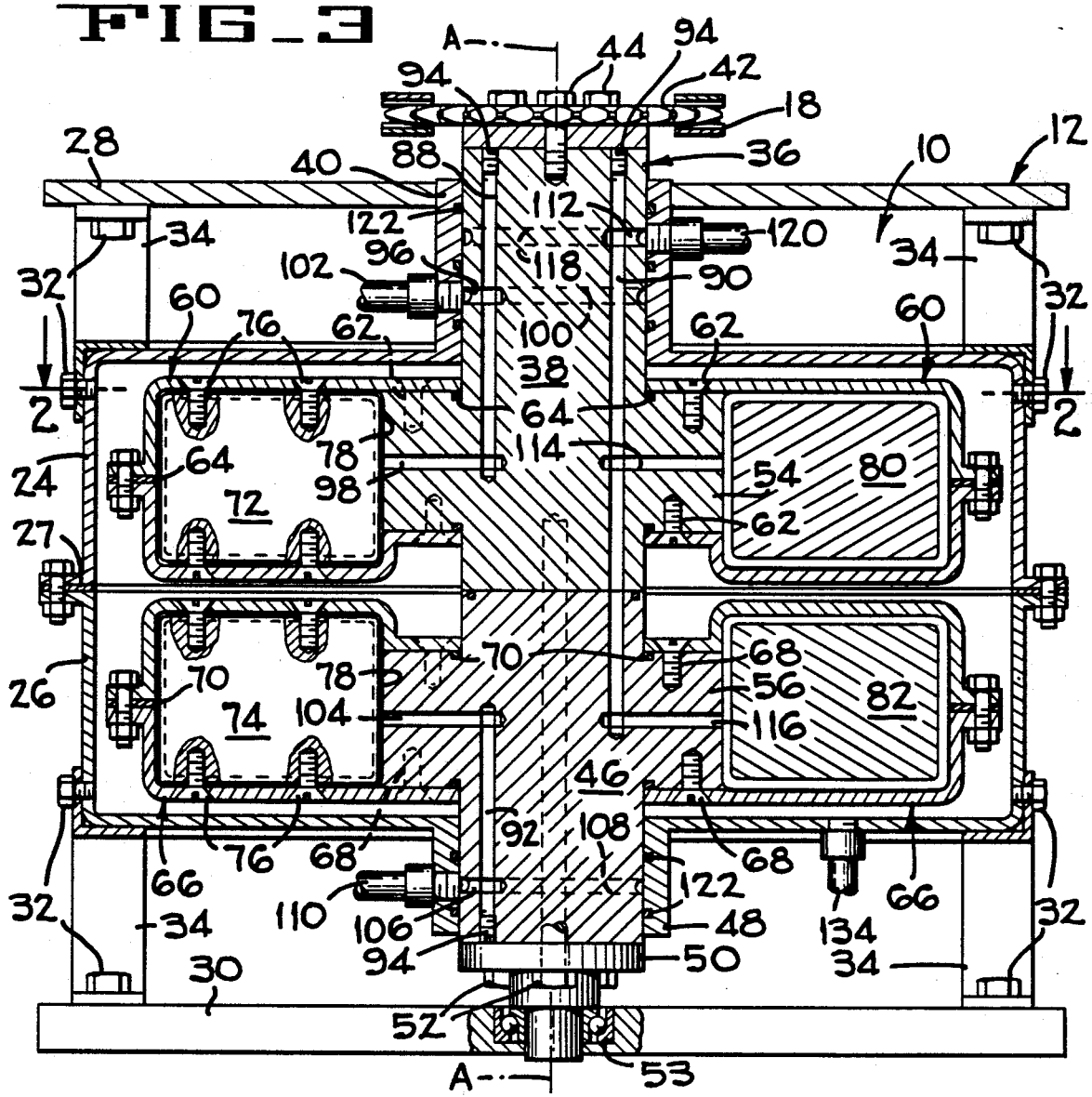
FIG_3
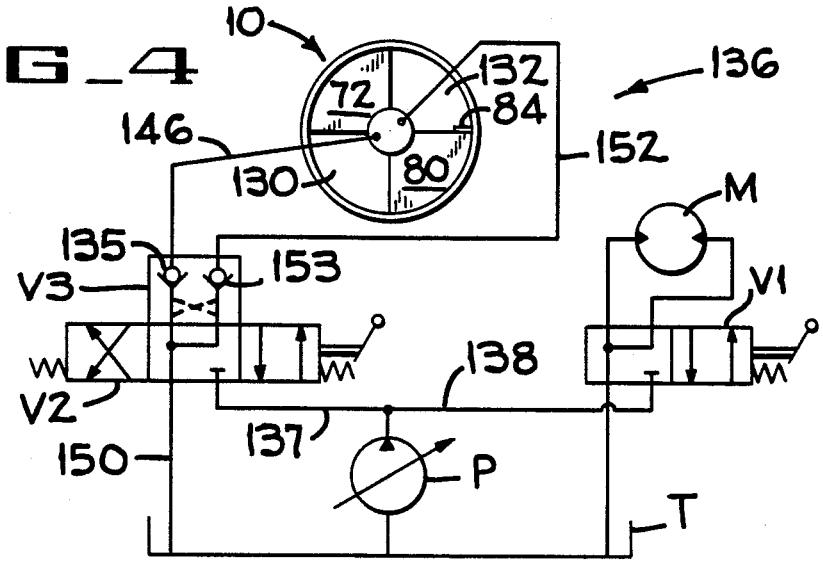
FIG_4

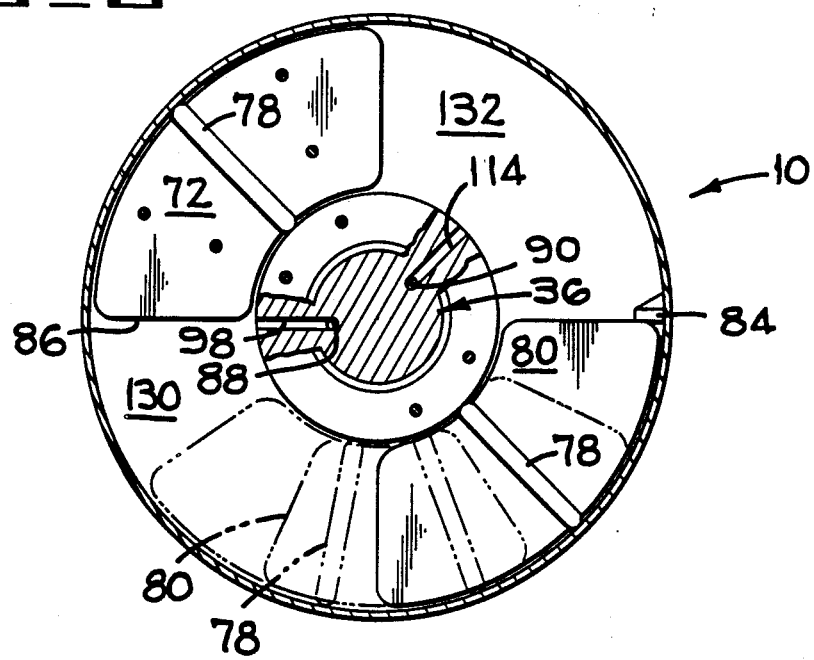
FIG_5
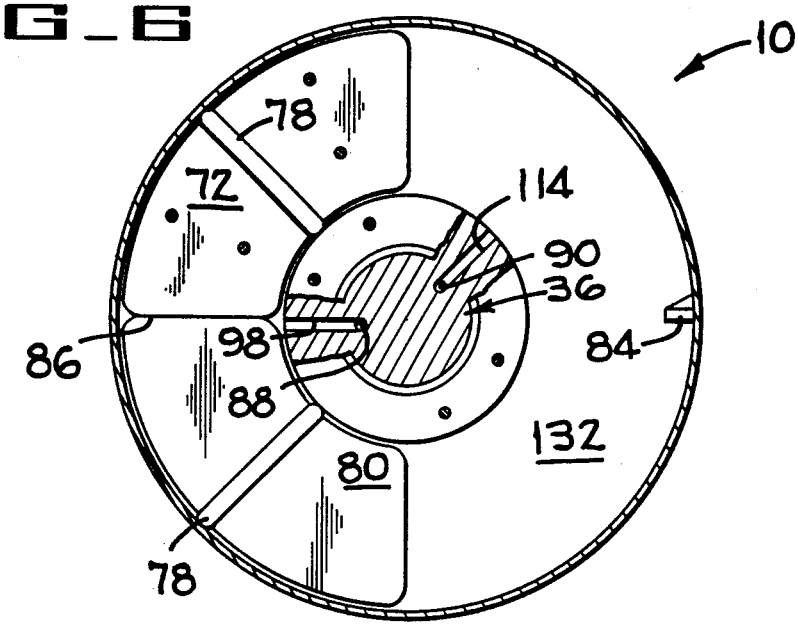
FIG_6
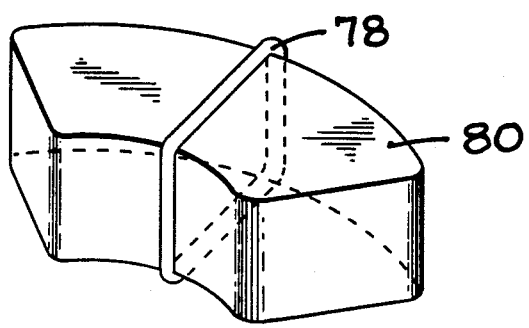
FIG_7

VARIABLE FORCE SHAKER

BACKGROUND OF THE INVENTION

1. Field of the Invention

The present invention relates to variable force, constant frequency shakers, and more particularly relates to tree shakers having adjustable weights which may be moved between opposed balanced positions which results in no shaking action when being rotated at a desired frequency and may be adjusted when rotating between the balanced position and to a plurality of unbalanced positions to provide variable shaking forces of a plurality of desired magnitudes.

2. Description of the Prior Art

Mobile tree shakers for harvesting fruit or nuts from trees or the like are well known in the art. Assignee's Peters U.S. Pat. No. 4,194,347 discloses a conventional mobile tree shaker; and Vallicella U.S. Pat. No. 3,964,244 discloses a mobile tree shaker having wings for collecting the fruit or nuts shaken from trees.

The above conventional tree shakers include a shaking head which is clamped to the trunk or limbs of a tree to have fruit or nuts shaken therefrom. The above prior art shakers include two unbalanced, non-adjustable counter rotating weights which are secured to shafts and apply a shaking force to the trunk or limbs of the tree as soon as the shafts start to rotate. Thus, the shafts must be stopped when the shaking head is being clamped on or removed from the tree to avoid damage to the bark of the tree. Therefore, the shafts must be accelerated from 0 speed to a desired maximum speed to shake the tree and then be returned to 0 speed before releasing the tree. This results in high torques, undesirable resonant frequencies, and wasted time each time a new tree or new limb is to be shook.

The undesirable resonant frequencies tend to damage the bark each time the tree is clamped or unclamped. When starting or stopping, the shaker may take one or two wild oscillations if the operator is unclamping or clamping as the resonance occurs which can cause sever barking of the tree. This damage is due to torsional and translational natural frequencies in the shaking system.

Damage to the fruit is also noted in the prior art shakers during the start and end of each low frequency, high amplitude burst. These low frequency high amplitude excursions result in substantial damage to undetached fruit by hitting limbs or other undetached fruit. Also, with a major portion of the fruit being detached in a period of one or two seconds, considerable damage results from fruit landing on fruit on conventional catch frames of prior art systems.

SUMMARY OF THE INVENTION

The variable force shaker of the present invention includes a shaking head having a first eccentric mass fixed to a rotatable member and a second eccentric mass movable about the rotatable member. When the rotatable member is being driven, the second eccentric mass may be positioned diametrically opposed to the first eccentric mass providing balanced forces thus precluding shaking forces from occurring; and may be positioned in a plurality of eccentric positions providing unbalanced forces of different magnitudes thereby imparting shaking motion to the rotatable members and the shaking head at the most desirable force for shaking produce from the trees or plants. The rotatable member may be driven at one or more selected constant speeds, and may be connected to a tree when the first eccentric mass and second eccentric mass are in their balanced diametrically opposed positions. Shaking forces will be imparted to the shaking head and tree when the second movable mass is moved out of the diametrically opposed position.

BRIEF DESCRIPTION OF THE DRAWINGS

FIG. 1 is a perspective of a portion of a tree shaker shown clamped to a tree trunk, the foliage of the tree being cut away.

FIG. 2 is a section taken along lines 2—2 of FIG. 3 showing the variable force shaker of the present invention with a movable weight in its balanced position.

FIG. 3 is an enlarged section taken along lines 3—3 of FIG. 2.

FIG. 4 is a simplified hydraulic circuit for the variable force shaker.

FIG. 5 is an operational view in section showing the movable weight in three operative positions.

FIG. 6 is an operational view similar to FIG. 5 but showing the movable weight in its maximum eccentric position for providing its maximum shaking forces.

FIG. 7 is a perspective of one of the movable weights illustrating an O-ring fluid seal in a groove in the weight.

DESCRIPTION OF THE PREFERRED EMBODIMENT

The method and apparatus of the present invention uses at least one variable force shaking head 10 (FIGS. 1-3) which is mounted on a clamping and shaking assembly 12 (FIG. 1) of a tree shaking apparatus (only a fragment being shown). The shaking apparatus may be of the general type disclosed in assignee's previously mentioned Peters U.S. Pat. No. 4,194,347 which includes an engine for providing power to drive the vehicle and a hydraulic pump P (FIG. 4). The Peters patent is incorporated by reference herein.

As shown in FIG. 1, the clamping and shaking assembly 12 includes a pair of conventional hydraulically actuated clamping jaws 14 which are shown clamped to the trunk of a tree 16 but may be elevated and rotated into positions to permit clamping onto the limbs of a big tree, all as is well known in the art. The two variable force shaker heads 10 are driven by a chain drive 18 powered by a hydraulic motor M preferably in a pressure compensated circuit.

As best shown in FIGS. 2 and 3, each variable force shaker head 10 includes an upper flanged housing 24 bolted to a lower stationary flanged housing 26 having a fluid seal 27 therebetween. The upper and lower stationary housings are bolted to an upper wall 28 and a lower wall 30, respectively, of the clamping and shaking assembly 12 by capscrews 32 and a plurality of brackets 34.

A two piece shaft 36 includes an upper portion 38 which is journaled within a tubular portion 40 of the upper stationary housing 24 and has a sprocket 42 bolted thereto by a plurality of capscrews 44. A lower portion 46 of the shaft 36 is journaled within a tubular portion 48 of the lower stationary housing 26 and has a flanged spindle 50 secured thereto by a plurality of elongated capscrews 52. The reduced diameter portion of the spindle is journaled in a bearing 53 in the lower wall 30. The shaft 36 also includes a wide upper flange 54 spaced from a wide lower flange 56, each having a cylindrical outer surface.

An upper rotatable two piece flanged housing 60 is connected together and to the upper flange 54 of the shaft 36 in fluid tight engagement by threaded fastner 62 and fluid seals 64. Similarly, a lower rotatable two piece flanged housing 66 is connected together and to the lower flange 56 of the shaft 36 in fluid tight engagement by threaded fasteners 68 and fluid seals 70.

As best shown in FIGS. 2 and 3, upper and lower fixed weights 72,74 are rigidly secured to their rotatable housing 60 and 66, respectively, by connectors 76. An O-ring 78 (FIGS. 5–7) is fitted in a groove in each fixed weight 72,74 and movable weights 80,82 and engages mating surfaces of the upper and lower rotatable housing 60,66 to prevent fluid from flowing therepast.

Similarly, upper and lower movable weights 80,82 are movably received in their rotatable housing 60 and 66, respectively, between fixed stops 84 (only the stop in the upper housing being shown in FIGS. 2, 5 and 6) and one radial edge 86 of the associated fixed weight 72 or 74. It will be understood that the movable weights and the diametrically opposed fixed weights, when in their neutral or balanced positions shown in FIG. 2, impart no shaking forces to the clamping and shaking assembly 12 when rotating since the fixed and movable weights are of the same size and weight, and thus they are in balance. The movable weights 80,82 are shifted from their balanced position as shown in FIG. 2 to any one of a plurality of unbalanced or shake induced positions as shown in phantom lines in FIG. 5, and in full lines in FIG. 6.

Hydraulic fluid passageways 88,90 and 92 (FIG. 3) are drilled axially of the axis of rotation A—A of the shaft 36 and are closed by plugs 94. The passageway 88 communicates with the transverse passages 96,98 and with an annular groove 100 in shaft 36 which communicates with an external conduit 102 connected to the tubular portion 40 of the upper stationary housing 24. The passageway 92 communicates with the passageways 104 and 106; and passageway 106 communicates with an annular groove 108 which communicates with an external conduit 110 connected to the tubular portion 48 of the lower stationary housing 26. The passageway 90 communicates with the radial passageways 112, 114 and 116. Hydraulic fluid is directed into or out of passageway 112 through an annular groove 118 in the shaft 36 and an external conduit 120 connected to the tubular portion 40 of the upper stationary housing 4. A plurality of O-ring seals 122 assures that leakage of hydraulic fluid is reduced to a minimum.

As shown in FIGS. 2, 5 and 6 passageway 98 communicates with a first upper chamber 130 of variable size depending upon the position of the movable weight 80; and the passageway 114 communicates with a second upper chamber 132 of variable size depending upon the position of the upper movable weight 80. The lower passageway 104 and 116 (FIG. 3) communicates with the first and second lower variable size chambers (not shown) but similar to the upper chambers 130,132, respectively. An external conduit 134 is connected to the bottom wall of the lower stationary flanged housing 26 for draining any hydraulic fluid leakage to tank T (FIG. 4).

A simplified hydraulic diagram 136 (FIG. 4) is provided for controlling the rotation of the shaft 36 and for adjusting the upper movable weight 80 between its balanced position shown in FIG. 2 and its several unbalanced positions shown in phantom lines in FIG. 5 and in solid lines in FIG. 6.

Although the diagram 136 illustrates only the circuit for the upper rotating housing 60 and movable weight 80 therein, it will be apparent that the movable weight in the lower rotatable housing 64 will be controlled by the same circuit merely by connecting external conduit 110 (FIG. 3) to external conduit 102. It will also be understood that the variable force shaker head may be designed to include only a single rotatable housing such as the upper rotatable housing 60; or may include two or more rotatable housings and components therein depending upon the severity of the shaking forces needed to remove produce from a tree, vine or other type of plant.

As illustrated in FIG. 4, the hydraulic diagram 136 includes the tank T from which hydraulic fluid is drawn by a pump P driven by an engine (not shown) on the clamping and shaking assembly 12. The pump P supplies high pressure fluid through conduits 137 and 138, through motor M and valve V1 when open, and returns to tank T. The motor M is preferably driven at a predetermined speed, for example, 1400–1600 rpm to minimize starting and stopping torques and thus energy requirements, since a plurality of high inertia torques are eliminated when the weights 72 and 80 are in balance as shown in FIG. 2.

Although FIG. 1 illustrates a single motor M and chain drive 18 which drives the weights 10, it will be understood that a separate motor and separate chain drives may be provided for each shaking head. The number of sprocket teeth on the sprockets connected to the motor M (or motors) may vary for different crops. For example, when shaking almonds, a 32—32 or (1 to 1) tooth ratio may be used between the hydraulic motor and one of the shaking heads 10 thereby driving that head at 1400 rpm when the motor is driven at 1400 rpm. The other head may have a 32-17 tooth ratio thereby driving the other shaking head at 2635 rpm when the motor is driven at 1400 rpm.

When shaking walnuts, peaches, pecans and certain other types of produce, the sprocket ratios may be varied so that a motor speed of 1400 rpm will cause one shaking head to be driven at about 1915 rpm, and the other head to be driven at about 1034 rpm. When the motor is driven at 1600 rpm, one shaking head 10 is driven at about 1180 rpm and the other would be driven at about 1045 rpm. It will be understood that other ratios may be used for other fruits or nuts.

The pump P also provides high pressure fluid to weight positioning valve V2. If valves V1 and V2 are closed as shown in FIG. 4, the pump P maintains a constant pressure without circulating oil back to tank T. When the core of the valve V2 is moved to the right, fluid flows from conduit 137, through a cross passage in valve V2 and hydraulic locking valve V3 which opens check valve 135. High pressure fluid then flows through a conduit 146 into the first upper variable size chamber 130 (FIG. 2) thereby moving the upper weight 80 toward or against stop 84 at which time movable weight 80 will balance the fixed weight 72 thereby preventing shaking during rotation of the shaft 36. When the movable weight 80 moves toward or against the stop 84 it discharges hydraulic fluid in the upper movable size chamber 132 which flows through conduit 152, open check valve 153, and returns to tank T through conduit 150. When valve V2 is returned to the illustrated neutral position, check valves 135,153 close thereby hydraulically locking the movable weight in desired position. It will be understood that the upper movable weight 80 may be positioned in any one of an infinite number of positions as diagrammatically illustrated in FIG. 5 and need not be returned to the stop 84 but may be stopped at any intermediate point by returning valve V2 to its illustrated closed position thereby varying the shaking force between a hard force and a gentle force. When the valve V2 is centered, it is apparent that the movable counterweight 80 will be hydraulically locked in the selected position by the check valves 135,153 of hydraulic lock valve V3. It will also be apparent that the external conduit 110 (FIG. 3) when connected to conduit 102 will cause both movable weights to move simultaneously.

When the core of valve V2 is moved to the left, high pressure fluid flows from pump P, conduit 137, open valves V2 and V3, the conduit 152, and enters the upper variable size chamber 132 through previously described conduits and passages thereby moving the movable weight 80 in a clockwise direction (FIGS. 2 and 4) from a balanced position to any one of a plurality of unbalanced position as shown in FIGS. 5 and 6. Fluid in the variable size chamber 130 is returned to tank T through previously described passageways 98 and 88, conduit 146, open check valve 135 of valve V3, valve V2 and conduit 150 to tank T. Return of the valve V2 to its illustrated position will hydraulically lock the movable weights 80 and 82 in selected positions when external conduit 110 is connected to conduit 102.

In operation, two counter rotating variable force shaker heads 10 (FIG. 1) are preferably mounted within the clamping and shaking assembly 12 and are driven by the hydraulic motor M and chain 18 in opposite directions. The trunk 16, or a limb of a tree, may be engaged and clamped while the shaker heads 10 are being driven when their fixed and movable weights 72,80 are in balance since no shaking force will be applied to the tree at that time.

When shaking fruit, such as apples or peaches into catch frames on a harvester, it is desirable to avoid shaking large amount of fruit into the frames at the same time since the fruit falling upon other fruit results in bruising the fruit. Since the variable force shaker assembly 12 can be clamped to the tree while the weights 72,80 and 74,82 are inbalance and are rotating; the weights may be rotated at the same speed while clamping, unclamping or shaking at any unbalanced position. The movable weights can be moved slightly out of balance to provide gentle shaking forces which will dislodge soft fruit from the tree first and that fruit may be conveyed away before harder to dislodge fruit is shaken from the tree thus minimizing bruising. By shifting the movable weight 80 progressively further away from the balanced position of the weight 80, the progressively harder to dislodge produce may be shaken from the tree. Also, the speed of the shakers may be varied, if needed, and/or the eccentricity of the movable counterweights may be varied during the tree shaking operation to dislodge fruit or nuts from nodal points of branches that do not shake at specific speeds.

From the foregoing description it is apparent that the variable force shaker enables a tree to be gripped when the movable and fixed weights of the shaker heads are in balance and are rotated at a desired speed. The eccentric weights may be moved to one or a number of plurality of eccentric positions which provide the most desirable removal of produce.

Although the best mode contemplated for carrying out the present invention has been herein shown and described it will be apparent that modification and variation may be made without departing from what is regarded to be the subject matter of the invention.

What is claimed is:

1. A variable force shaking head comprising:
   means for rotating an eccentrically weighted member about a shaft having an axis;
   means for supporting a movable weight on said eccentrically weighted member, and
   means for moving said movable weight about said axis between a position in balance with said eccentrically weighted member for precluding shaking about said axis, and a plurality of selected unbalanced positions about said axis to impart a shaking action of different insensities to said shaft.

2. An apparatus according to claim 1 wherein said variable force shaking head provides the shaking force for shaking a tree.

3. An apparatus according to claim 1 and additionally comprising a clamping and shaking assembly supporting said rotatable shaft and adapted to be clamped to a tree, and power means supported by said assembly for driving said shaft, said clamping and shaking assembly being clamped to said tree while said movable weight is in said balanced position and is being driven thereby precluding shaking of the tree while being clamped, and the tree being shook with progressively greater force as said movable weight is moved away from said balanced position.

4. An apparatus according to claim 1 wherein said eccentrically weighted member includes a fixed weight and wherein said movable weight is of the same size and weight as said fixed weight and is diametrically opposed to said fixed weight when in said balanced position.

5. An apparatus according to claim 1 and additionally comprising:
   a clamping and shaking assembly adapted to be clamped to a tree, means for rotatably supporting a pair of said rotatable shaft means on said clamping and shaking assembly, and drive means supported by said clamping and shaking assembly for driving said pair of variable force shaking heads at the same speed and in opposite directions.

6. A variable force shaking head comprising:
   means for rotating an eccentrically weighted member about a shaft having an axis;
   means for supporting a movable weight on said eccentrically weighted member,
   means for moving said movable weight about said axis between a position in balance with said eccentrically weighted member for precluding shaking about said axis, and a plurality of selected unbalanced positions about said axis to impart a shaking action of different intensities to said shaft; wherein said eccentrically weighted member is a rotatable housing secured to said shaft and having a fixed weight rigidly secured thereto, said fixed weight and said movable weight being of the same magnitude, and power means for controllably moving said movable weight between said in balanced position and said plurality of selected unbalanced positions.

7. An apparatus according to claim 6 wherein said fixed weight and said movable weight are in fluid sealed engagement within said rotatable housing, and wherein said power means is a controllable hydraulic system for directing hydraulic fluid into said housing for selectively moving said movable weight between said balanced position and said plurality of selected unbalanced positions.

8. An apparatus according to claim 7 wherein a plurality of said rotatable housing are concentric to each other and are secured to said shaft, wherein each housing has a fixed weight rigidly secured thereto an a movable weight therein, wherein said fixed weights and said movable weights are of the same magnitude, and wherein said power means is a controllable hydraulic system for directing hydraulic fluid into said rotatable housings for simultaneously and selectively moving each of said movable weights between said balanced position and said plurality of preselected unbalanced positions.

9. An apparatus according to claim 8 wherein each of said movable weights are of the same size and weight as each of said fixed weights and are diametrically opposed to said associated fixed weight when in said balanced position.

10. A variable force shaking head comprising:
means defining a rotatable shaft having fluid flow passages therein;
means defining a rotatable housing secured in fluid sealed engagement to said shaft for rotation therewith;
means defining a fixed weight secured to and in fluid sealed engagement relative to said rotatable housing and said shaft;
means defining a movable weight in fluid sealed engagement with said rotatable housing and said shaft; and
means for directing hydraulic fluid into said rotatable housing between said fixed weight and said movable weight for selectively moving said movable weight between a balanced position for providing shake free rotation of the shaking head, and a plurality of unbalanced positions for providing a plurality of shaking forces of different magnitude when the shaft is driven.

11. An apparatus according to claim 10 and additionally comprising means defining a stationary housing surrounding said rotatable housing means, and means included in said stationary housing for rotatably receiving said rotatable shaft means.

12. An apparatus according to claim 11 wherein said stationary housing is rigidly secured to a clamping and shaking assembly adapted to be clamped to and unclamped from a tree when the shaft is being driven at a shaking speed and the movable weight is in said balanced position thereby precluding shaking of the tree during the tree clamping and unclamping operation.

13. An apparatus for shaking product from plants such as trees having a clamping and shaking assembly adapted to be clamped to a tree; the improvement which comprises;
means defining an upper and lower stationary housing rigidly secured to said clamping and shaking assembly;
a shaft journaled in said stationary housing for rotation therein about an axis;
operator controlled first power means for driving said shaft and stopping the rotation of said shaft,
means defining upper and lower rotatable housings rigidly secured to said shaft for rotation within said associated upper and lower stationary housings;
means defining upper and lower fixed weights rigidly secured to said upper and lower rotatable housing and in fluid sealed relationship thereto;
means defining upper and lower movable weights of the same size and weight as said fixed weights being movably received and sealed to said associated upper and lower rotatable housings, said upper and lower movable weights being movable between a balanced position diametrically opposed to the associated upper and lower fixed weights and a plurality of unbalanced positions;
abutment means in said upper and lower rotatable housings for engaging and maintaining said movable weights in said balanced position when urged in one direction; and
second operator control power means for maintaining said movable weights against said abutment means when clamping and unclamping said shaking assembly to the plants, and for moving said movable weights to desired ones of said unbalanced positions when shaking produce from the plants.

14. A variable force shaking method which comprises the steps of:
rotating an eccentrically weighted member about a shaft having an axis;
supporting a movable weight on said eccentrically weighted member; and
moving said movable weight about said axis while said shaft is being rotated between a position in balance with said eccentrically weighted member for precluding shaking about said axis, and a plurality of selected unbalanced positions about said axis for imparting shaking forces of different intensities to the shaft.

15. A method according to claim 14 wherein the shaft is journaled on a clamping and shaking assembly which is clamped to a tree for shaking produce from the tree, and additionally comprising the step of clamping and unclamping the clamping and shaking assembly when the shaking assembly is being driven at a predetermined shaking speed.

* * * * *